United States Patent
Poniatowski

(10) Patent No.: US 8,141,952 B2
(45) Date of Patent: Mar. 27, 2012

(54) ADJUSTABLE BOLSTER ASSEMBLY

(75) Inventor: Jeffrey J. Poniatowski, Royal Oak, MI (US)

(73) Assignee: Intier Automotive Inc, Newmarket (CA)

( * ) Notice: Subject to any disclaimer, the term of this patent is extended or adjusted under 35 U.S.C. 154(b) by 494 days.

(21) Appl. No.: 12/373,098

(22) PCT Filed: Jul. 10, 2007

(86) PCT No.: PCT/CA2007/001212
§ 371 (c)(1),
(2), (4) Date: Jan. 9, 2009

(87) PCT Pub. No.: WO2008/006200
PCT Pub. Date: Jan. 17, 2008

(65) Prior Publication Data
US 2009/0289481 A1 Nov. 26, 2009

(51) Int. Cl.
*A47C 3/00* (2006.01)

(52) U.S. Cl. .................. 297/284.9; 297/452.4

(58) Field of Classification Search ............ 297/284.9, 297/452.4
See application file for complete search history.

(56) References Cited

U.S. PATENT DOCUMENTS

| | | | |
|---|---|---|---|
| 2,619,157 A * | 11/1952 | Guyton et al. ............ | 297/284.9 |
| 4,500,136 A | 2/1985 | Murphy | |
| 4,536,030 A * | 8/1985 | Sakurada et al. ......... | 297/284.9 |
| 4,776,632 A * | 10/1988 | Akimori et al. .......... | 297/284.9 |
| 4,804,221 A * | 2/1989 | Saiki ........................ | 297/284.9 |
| 4,885,513 A | 12/1989 | Sakamoto et al. | |
| 4,924,163 A | 5/1990 | Sakamoto et al. | |
| 5,328,236 A | 7/1994 | Mizushima et al. | |
| 5,810,436 A * | 9/1998 | Surot ....................... | 297/256.13 |
| 5,810,445 A * | 9/1998 | Surot ....................... | 297/411.37 |
| 5,857,743 A | 1/1999 | Ligon et al. | |
| 6,478,377 B2 * | 11/2002 | Kassai et al. ............. | 297/256.1 |
| 6,619,739 B2 | 9/2003 | McMillen | |
| 7,077,476 B2 | 7/2006 | McMillan | |
| 7,275,792 B2 * | 10/2007 | Pos .......................... | 297/396 |
| 7,607,735 B2 * | 10/2009 | Kuno et al. ............... | 297/284.6 |
| 7,810,883 B2 * | 10/2010 | Berger et al. ............. | 297/256.1 |
| 2004/0080198 A1 | 4/2004 | Frank | |
| 2004/0140705 A1 * | 7/2004 | McMillen et al. ........ | 297/378.1 |
| 2005/0046253 A1 | 3/2005 | Hofschulte et al. | |
| 2006/0214487 A1 * | 9/2006 | Holdampf et al. ........ | 297/284.9 |
| 2007/0228792 A1 * | 10/2007 | Chen et al. ............... | 297/284.9 |
| 2008/0036258 A1 * | 2/2008 | Holdampf et al. ........ | 297/284.9 |
| 2008/0136237 A1 * | 6/2008 | Kayumi et al. ........... | 297/284.9 |
| 2009/0026821 A1 * | 1/2009 | Macht et al. .............. | 297/284.9 |
| 2009/0218858 A1 * | 9/2009 | Lawall et al. ............. | 297/216.1 |

FOREIGN PATENT DOCUMENTS

| | | |
|---|---|---|
| DE | 8203540 U1 | 5/1982 |
| DE | 20100018 U1 | 2/2002 |
| EP | 0582821 A1 | 2/1994 |

* cited by examiner

*Primary Examiner* — David Dunn
*Assistant Examiner* — David E Allred
(74) *Attorney, Agent, or Firm* — Miller Canfield

(57) ABSTRACT

An adjustable bolster assembly is provided for use with a seat assembly. The adjustable bolster assembly includes a mounting bracket configured to be fixedly secured to the seat assembly. The adjustable bolster assembly also includes a pair of side bolster paddles. Each of the side bolster paddles is operatively mounted on the mounting bracket for movement between a retracted position and a deployed position in which the pair of side bolster paddles extend forward of the mounting bracket. An actuator is mounted on the mounting bracket and operatively connected to the pair of side bolster paddles for effecting the movement.

8 Claims, 9 Drawing Sheets

ADJUSTABLE BOLSTER ASSEMBLY

FIELD OF THE INVENTION

The invention relates to seat assemblies for an automotive vehicle. More particularly, the invention relates to an adjustable bolster assembly for moving side bolsters between a retracted position and a deployed position.

DESCRIPTION OF RELATED ART

Automotive vehicles include one or more seat assemblies for supporting a seat occupant within a passenger compartment. The seat assemblies typically include a generally horizontal seat cushion and a seat back pivotally coupled to the seat cushion providing selective angular adjustment of the seat back between a plurality of reclined seating positions. The seat back commonly includes side bolsters or side support structures for laterally supporting the seat occupant. Such side bolsters are particularly useful in supporting the seat occupant during lateral accelerations of the vehicle.

As is commonly known in the art, variable position or adjustable side bolsters adjust the amount of lateral support provided by the seat assembly by adjusting the position of the side bolsters relative to the seat back. The adjustment is generally accomplished by pivoting the side bolsters relative to the seat back. The adjustment is generally accomplished by pivoting the side bolsters inward toward the occupant. Inward adjustment of the side bolsters relative to the seat back results in a more vertically angled side bolster and thus increasing the amount of lateral support provided by the seat assembly. The adjustable side bolsters present, however, a problem in that the inward pivotal movement results in a more narrow seat assembly. Consequently, it is desirable to provide a simple yet robust bolster assembly that allows for increased lateral support while not decreasing the width of the seat assembly.

SUMMARY OF THE INVENTION

According to one aspect of the invention, an adjustable bolster assembly is provided for use with a seat assembly. The adjustable bolster assembly includes a mounting bracket configured to be fixedly secured to the seat assembly. The adjustable bolster assembly also includes a pair of side bolster paddles. Each of the side bolster paddles is operatively mounted on the mounting bracket for movement between a retracted position and a deployed position in which the pair of side bolster paddles extend forward of the mounting bracket without reducing the width of the seat assembly. An actuator is mounted on the mounting bracket and operatively connected to the pair of side bolster paddles for effecting the movement.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
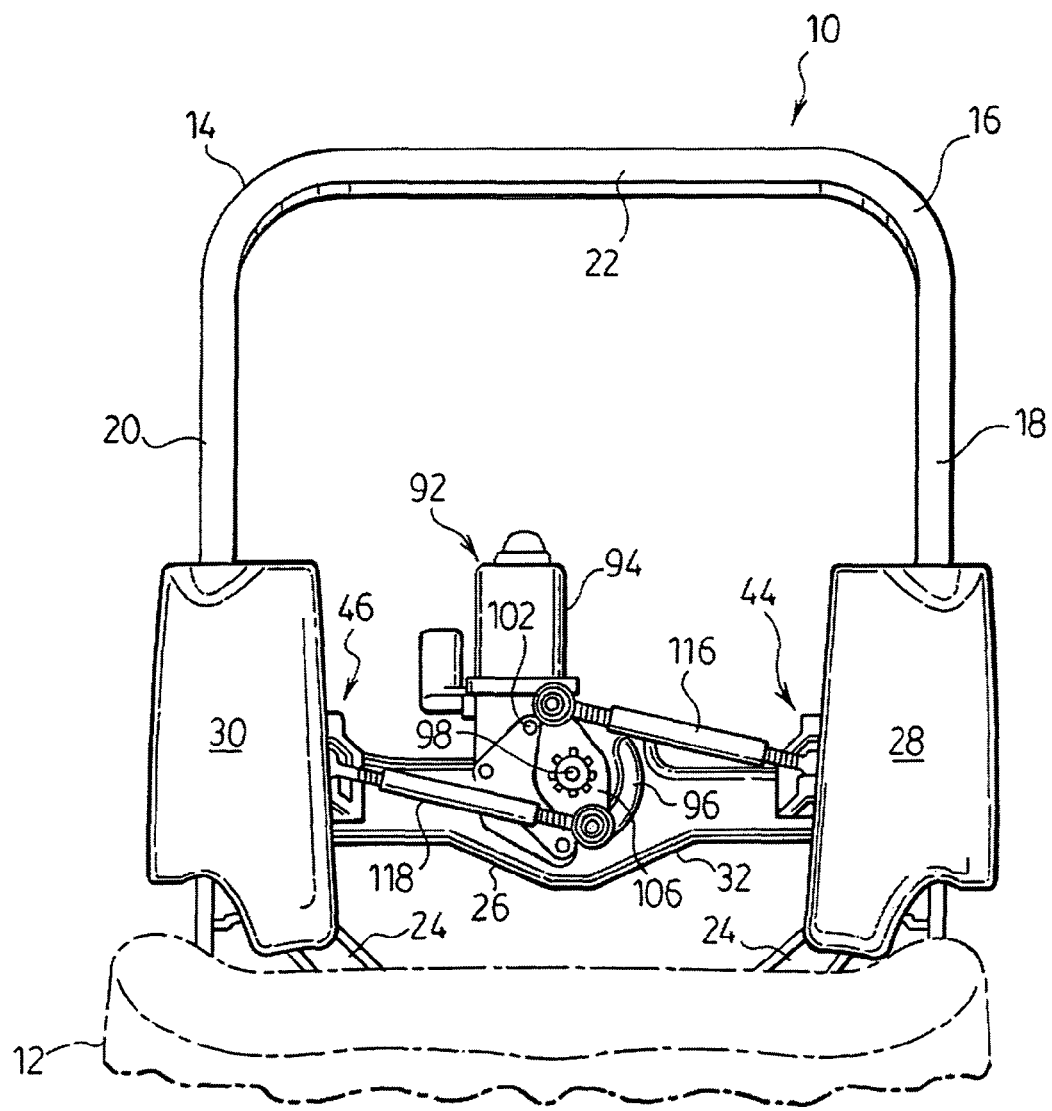
FIG. 1 is a fragmentary, front view of a seat assembly including an adjustable bolster assembly showing a pair of side bolster paddles in a retracted position according to the invention.

Referring to FIG. 1, a seat assembly is generally shown at 10 for supporting a seat occupant in an automotive vehicle. The seat assembly 10 includes a generally horizontal seat cushion 12 and a seat back 14. The seat back 14 includes a frame assembly 16, for supporting a foam pad (not shown) encased in a trim cover (not shown). It will be appreciated that although the frame assembly 16 for the seat back 14 is shown, the same general construction may be utilized for a frame assembly (not shown) of the seat cushion 12. The seat back 14 is pivotally coupled to the seat cushion 12 by a recliner mechanism (not shown) as is well known in the art. The recliner mechanism provides selective angular adjustment of the seat back 14 between a plurality of reclined seating positions.

The frame assembly 16 includes a pair of laterally spaced apart side members 18, 20 and an upper cross member 22 extending between the side members 18, 20. The side members 18, 20 are generally parallel and define a plane therebetween. A lower cross member 24 extending between the side members 18, 20 provides extra rigidity to the frame assembly 16. The lower cross member 24 is spaced apart from and parallel to the upper cross member 22.

Figure 2:
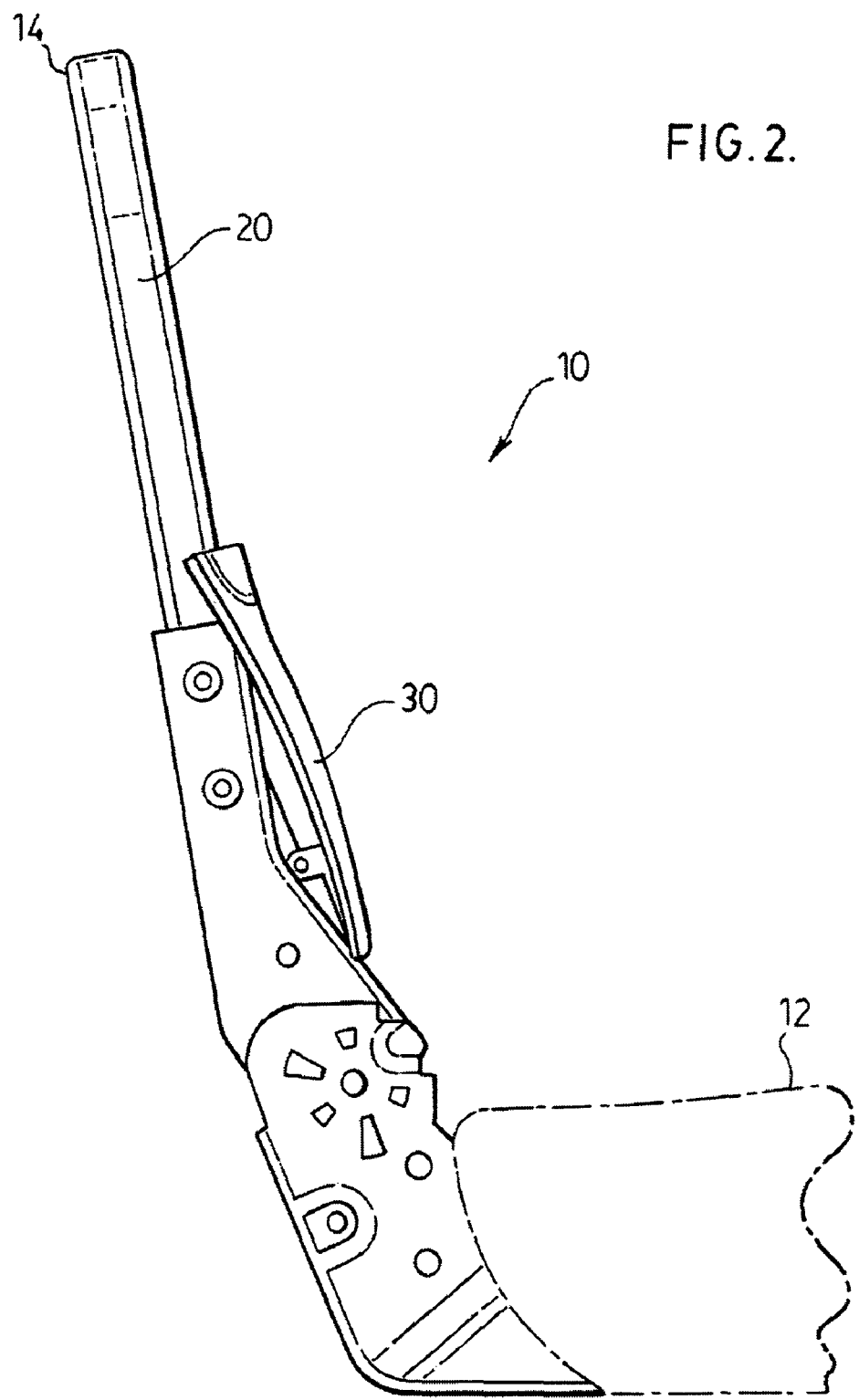
FIG. 2 is a fragmentary, side view of the seat assembly showing the pair of side bolster paddles in the retracted position.
Figure 3:
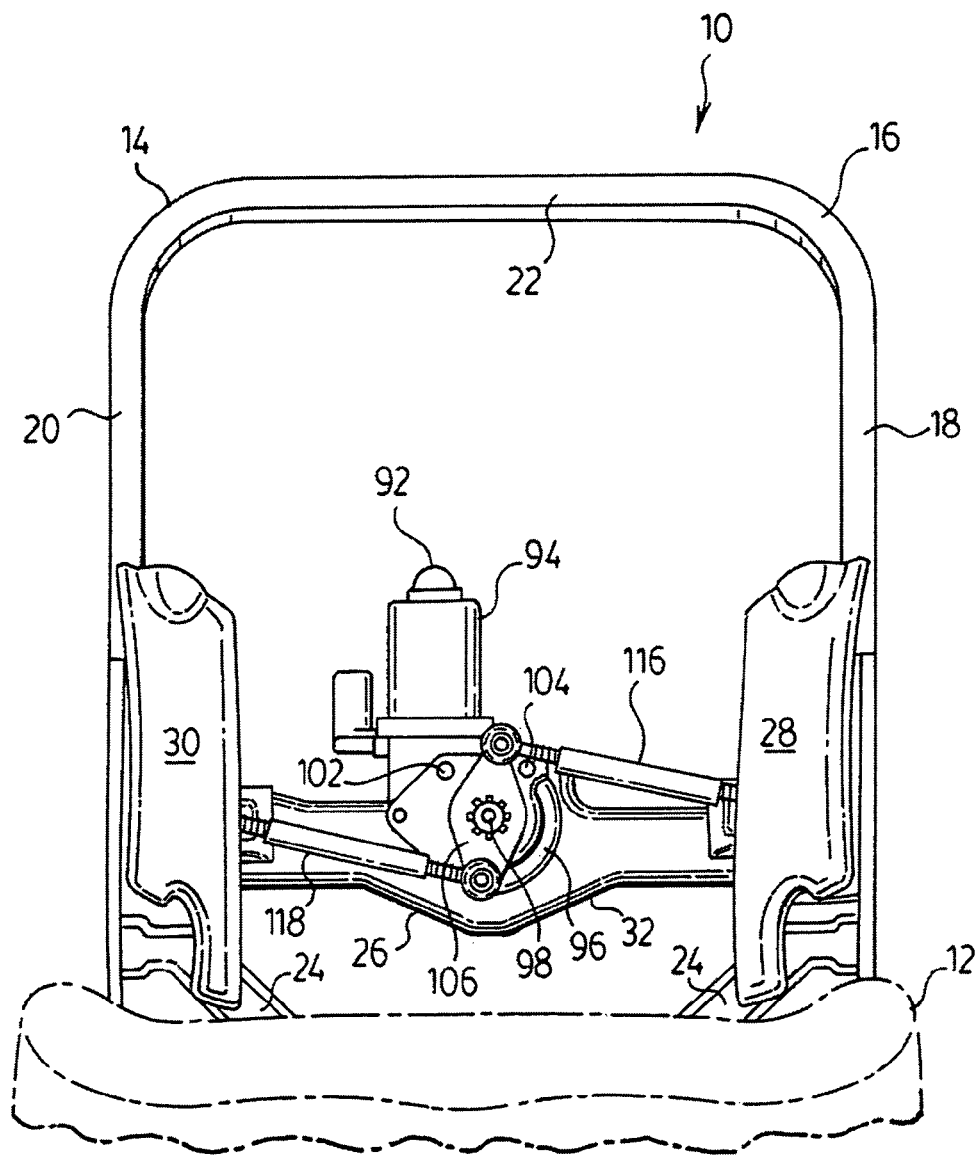
FIG. 3 is a fragmentary, front view of the seat assembly showing the pair of side bolster paddles in a deployed position.
Figure 4:
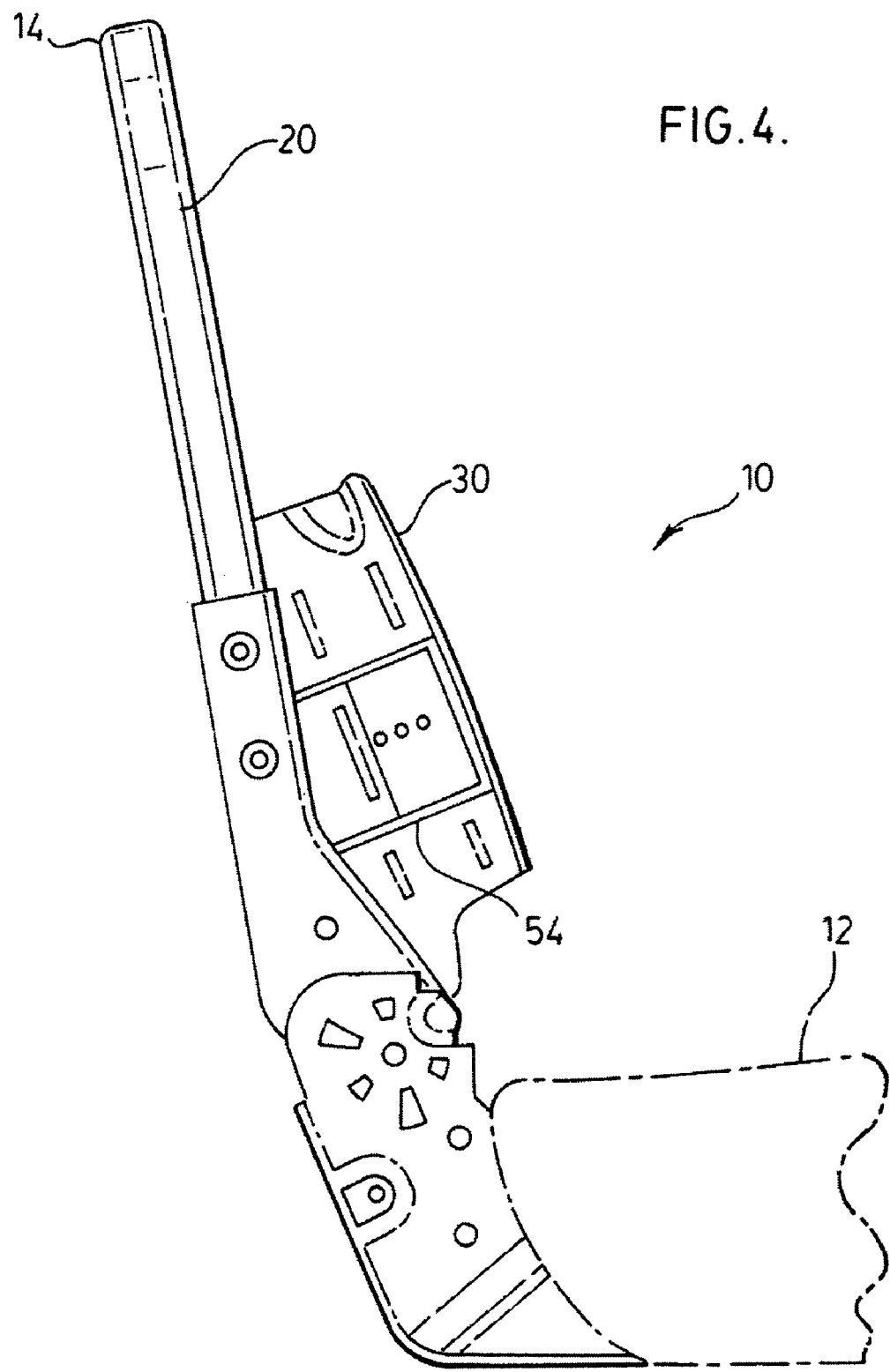
FIG. 4 is a fragmentary, side view of the seat assembly showing the pair of side bolster paddles in the deployed position.

An adjustable bolster assembly 26, is a modular assembly, which is fixedly secured to the frame assembly 16. The adjustable bolster assembly 26 is preferably disposed between the upper 22 and lower 24 cross members of the frame assembly 16. The adjustable bolster assembly 26 is provided for moving left 28 and right 30 side bolster paddles between a retracted position and a deployed position. In the retracted position, the left 28 and right 30 side bolster paddles are generally coplanar with the plane of the side members 18, 20, as shown in FIGS. 1 and 2. In the deployed position, the left 28 and right 30 side bolster paddles are disposed laterally outward and forward of the left 28 and right 30 side bolster paddles in the retracted position, as shown in FIGS. 3 and 4.

Figure 5:
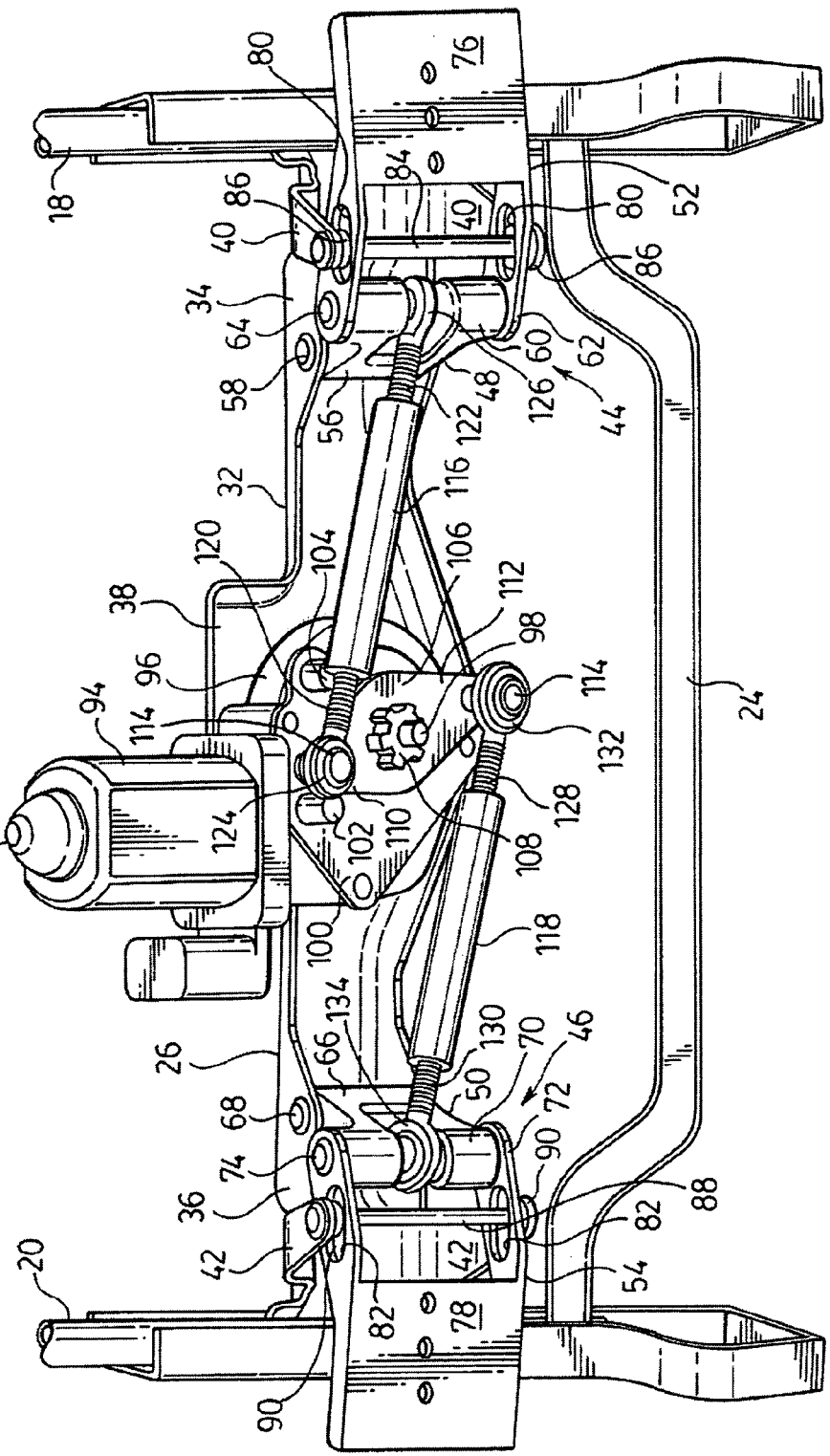
FIG. 5 is an enlarged, front perspective view of the adjustable bolster assembly.
Figure 6:
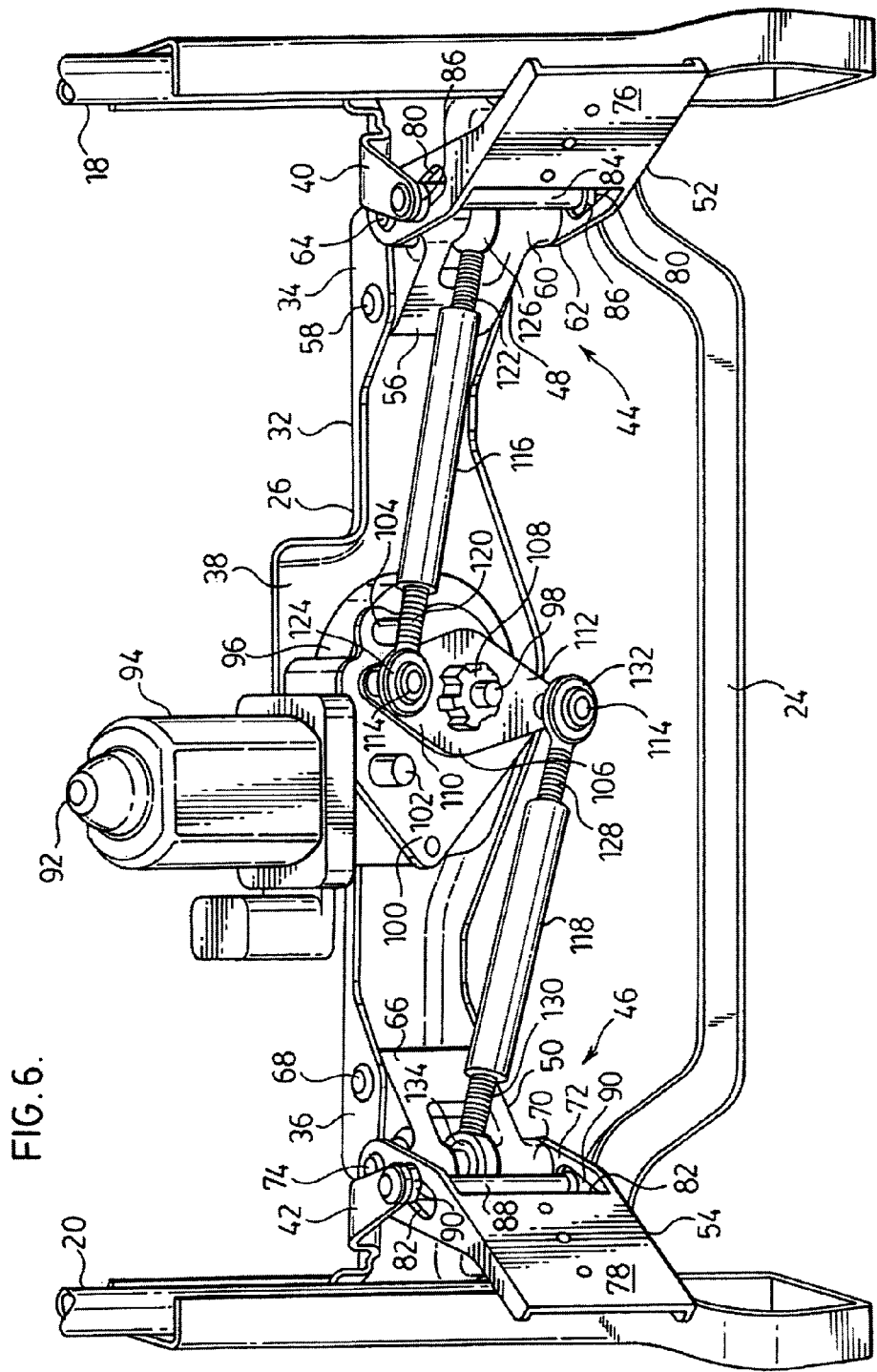
FIG. 6 is an enlarged, front perspective view of the adjustable bolster assembly in an actuated position.

Referring to FIGS. 5 and 6, the adjustable bolster assembly 26 includes a mounting bracket 32, extending between the side members 18, 20. The mounting bracket 32 includes a first end 34 and a second end 36 fixedly secured to the respective side members 18, 20. The mounting bracket 32 also includes a middle section 38 disposed between the first 34 and second 36 ends. The first end 34 of the mounting bracket 32 includes a guide comprising a pair of vertically spaced apart guide arms 40. Similarly, the second end 36 of the mounting bracket 32 includes a guide comprising a pair of vertically spaced apart guide arms 42.

The adjustable bolster assembly 26 also includes a first adjustment mechanism 44, which is operatively coupled to the first end 34 of the mounting bracket 32 and a second adjustment mechanism 46, which is operatively coupled to the second end 36 of the mounting bracket 32. Each of the first 44 and second 46 adjustment mechanisms include a generally U-shaped lever arm 48, 50 and a paddle mount 52, 54, respectively.

The first adjustment mechanism 44 has the generally U-shaped lever arm 48 disposed with a first or closed end 56 pivotally coupled at pivot 58 to the first end 34 of the mounting bracket 32. A second or open end 60 of the lever arm 48 is pivotally coupled to a proximal end 62 of the paddle mount 52 by a pivot pin 64 extending therethrough.

The second adjustment mechanism 46 has the generally U-shaped lever arm 50 disposed with a first or closed end 66 pivotally coupled at pivot 68 to the second end 36 of the mounting bracket 32. A second or open end 70 of the lever arm 50 is pivotally coupled to a proximal end 72 of the paddle mount 54 by a pivot pin 74 extending therethrough.

The paddle mounts 52, 54 extend between their respective proximal end 62, 72, which is pivotally coupled to the second end 60, 70 of the respective lever arm 48, 50, and a flat distal end 76, 78, which is provided for mounting the left 28 and right 30 side bolster paddles, respectively. Each paddle mount 52, 54 includes a pair of spaced apart slots 80, 82 disposed between the proximal 62, 72 and flat distal ends 76, 78 of the respective paddle mount 52, 54.

The first adjustment mechanism 44 has a guide pin 84 extending between the guide arms 40 at the first end 34 of the mounting bracket 32. The guide pin 84 is disposed through the slots 80 of the paddle mount 52, slidably and pivotally coupling the paddle mount 52 to the first end 34 of the mounting bracket 32. The guide pin 84 includes a nylon bushing 86 adjacent each guide arm 40 for slidably engaging the slots 80 to allow for smooth movement of the paddle mount 52.

Similarly, the second adjustment mechanism 46 has a guide pin 88 extending between the guide arms 42 at the second end 36 of the mounting bracket 32. The guide pin 88 is disposed through the slots 82 of the paddle mount 54, slidably and pivotally coupling the paddle mount 54 to the second end 36 of the mounting bracket 32. The guide pin 88 includes a nylon bushing 90 adjacent each guide arm 42 for slidably engaging the slots 82 to allow for smooth movement of the paddle mount 54.

It will be appreciated that each of the first 44 and second 46 adjustment mechanisms can be configured as four bar linkages without varying from the scope of the invention.

The bolster assembly 26 further includes an actuator assembly, generally indicated at 92. The actuator assembly 92 includes an electric motor 94 coupled to a gear assembly 96. It shall be understood that while the preferred embodiment is illustrated using an electric motor, a manual actuator, such as a cable assembly (not shown) or linkage assembly (not shown), may be used without varying in scope from the presented invention. The gear assembly 96 is fixedly secured to the mounting bracket 32, preferably at middle section 38 and includes an output shaft 98 extending axially therefrom. A plate 100 is mounted to the gear assembly 96 and includes a hole (not shown) for allowing the output shaft 98 to extend therethrough. A rearward boss 102 and a forward boss 104 are fixedly secured to the plate 100 and extend axially therefrom.

The pivot plate 106 is fixedly secured to the shaft 98 by a retaining nut 108. The pivot plate 106 pivots between a first position or travel limit abutting the rearward boss or stop 102, shown in FIG. 5, when the left 28 and right 30 side bolster paddles are in the retracted position, and a second position or travel limit abutting the forward boss or stop 104, shown in FIG. 6, when the left 28 and right 30 side bolster paddles are in the deployed position. The pivot plate 106 includes a dowel 114 extending axially therefrom.

The adjustable bolster assembly 26 includes a first rod 116 and a second rod 118. The first 116 and second 118 rods are each disposed between the actuator 92 and the first 44 and second 46 adjustment mechanisms, respectively. An inner end 120 of the first rod 116 is pivotally and rotatably coupled by a universal joint 124 to the dowel 114 at the upper end 110 of the pivot plate 106. An outer end 122 of the first rod 116 is pivotally and rotatably coupled by a universal joint 126 to the pivot pin 64, at the second end 60 of the lever arm 48. An inner end 128 of the second rod 118 is pivotally and rotatably coupled by a universal joint 132 to the dowel 114 at the lower end 112 of the pivot plate 106. An outer end 130 of the second rod 118 is pivotally and rotatably coupled by a universal joint 134 to the pivot pin 74, at the second end 70 of the lever arm 50. The first 116 and second 118 rods each has components that are threadingly joined together enabling the rods 116, 118 to be extensible to adjust the travel of the bolster paddle mounts 52, 54.

Figure 7:
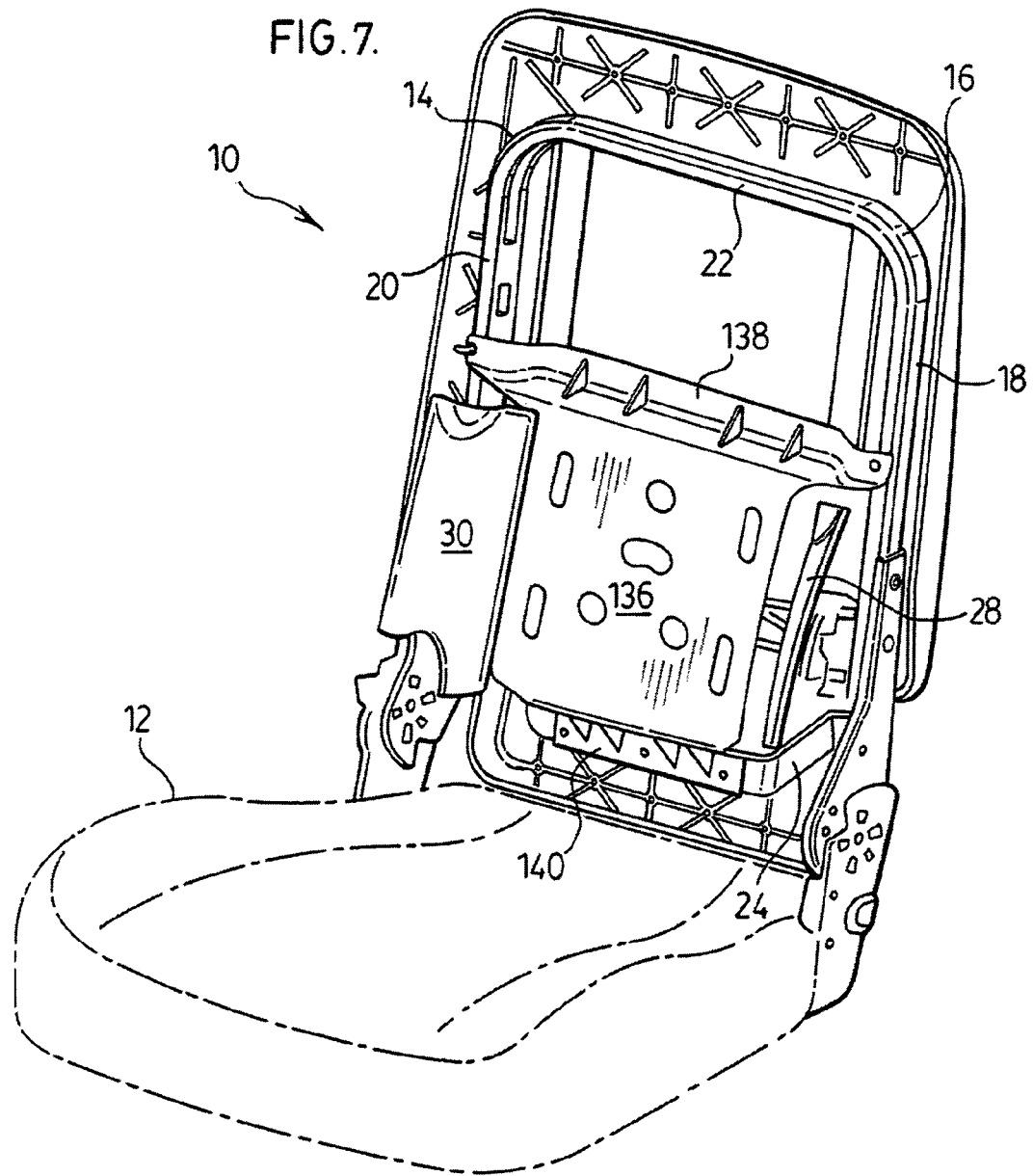
FIG. 7 is a front perspective view of the seat assembly including a shield covering the adjustable bolster assembly.

Referring to FIG. 7, the seat back 14 includes a contoured shield 136 disposed between the left 28 and right 30 side bolster paddles covering the adjustable bolster assembly 26. The shield 136 is fixedly secured at an upper end 138 to the side members 18, 20 and at a lower end 140 to the lower cross member 24. The shield 136 prevents the seat occupant from feeling components of the adjustable bolster assembly 26 other than the left 28 and right 30 side bolster paddles through the trim cover and foam pad.

In operation, starting with the left 28 and right 30 side bolster paddles in the retracted position, as shown in FIG. 1, the seat occupant actuates the electric motor 94 to adjust the amount of lateral support desired of the adjustable bolster assembly 26. The electric motor 94 urges the gear assembly 96 to rotate the output shaft 98 in a clockwise direction (when viewed from FIG. 1) causing the pivot plate 106 to rotate in the clockwise direction. As the pivot plate 106 rotates in the clockwise direction, the first rod 116 actuates the first adjustment mechanism 44, best seen in FIGS. 5 and 6. More specifically, as the pivot plate 106 rotates in the clockwise direction, the outer end 122 of the first rod 116 initially drives the lever arm 48 outwardly. The driving movement of the lever arm 48 causes the paddle mount 52, and therefore the left side bolster paddle 28, to move laterally outward. Further rotation of the pivot plate 106, causes the paddle mount to rotate, forwardly with respect to the side member 18. As the paddle mount 52 and left side bolster paddle 28 move laterally outward, the paddle mount 52 moves relative to the guide pin 84 within the slots 80. The slots 80 are longer than required to allow for adjusting the length of the first rod 116 and to reduce the possibility of binding during operation. Next, the paddle mount 52 and left side bolster paddle 28 pivot forwardly about the guide pin 84 until the amount of lateral support desired by the seat occupant is obtained, or until the pivot plate 106 abuts the forward boss 104. When the pivot plate 106 abuts the forward boss 104, the left 28 and right 30 side bolster paddles are in the deployed position, as shown in FIG. 3.

At the same time that the first rod 116 actuates the first adjustment mechanism 44, the second rod 118 actuates the second adjustment mechanism 46, best seen in FIGS. 5 and 6. More specifically, as the pivot plate 106 rotates in the clockwise direction (when viewed from FIG. 1), the outer end 130 of the second rod 118 causes the lever arm 50 to pivot outward about pivot 68. The pivoting movement of the lever arm 50 causes the paddle mount 54, and therefore the right side bolster paddle 30, to move laterally outward with respect to the side member 20. As the paddle mount 54 and right side bolster paddle 30 move laterally outward, the paddle mount 54 slides relative to the guide pin 88 within the slots 82. Again, the slots 82 are longer than required to allow for adjusting the length of the second rod 118 and to reduce the possibility of binding during operation. Next, the paddle mount 54 and right side bolster paddle 30 pivot forwardly about the guide pin 88 until the amount of lateral support desired by the seat occupant is obtained, or until the pivot plate 106 abuts the forward boss 104. When the pivot plate 106 abuts the forward boss 104, the left 28 and right 30 side bolster paddles are in the deployed position, as shown in FIG. 3.

Figure 8:
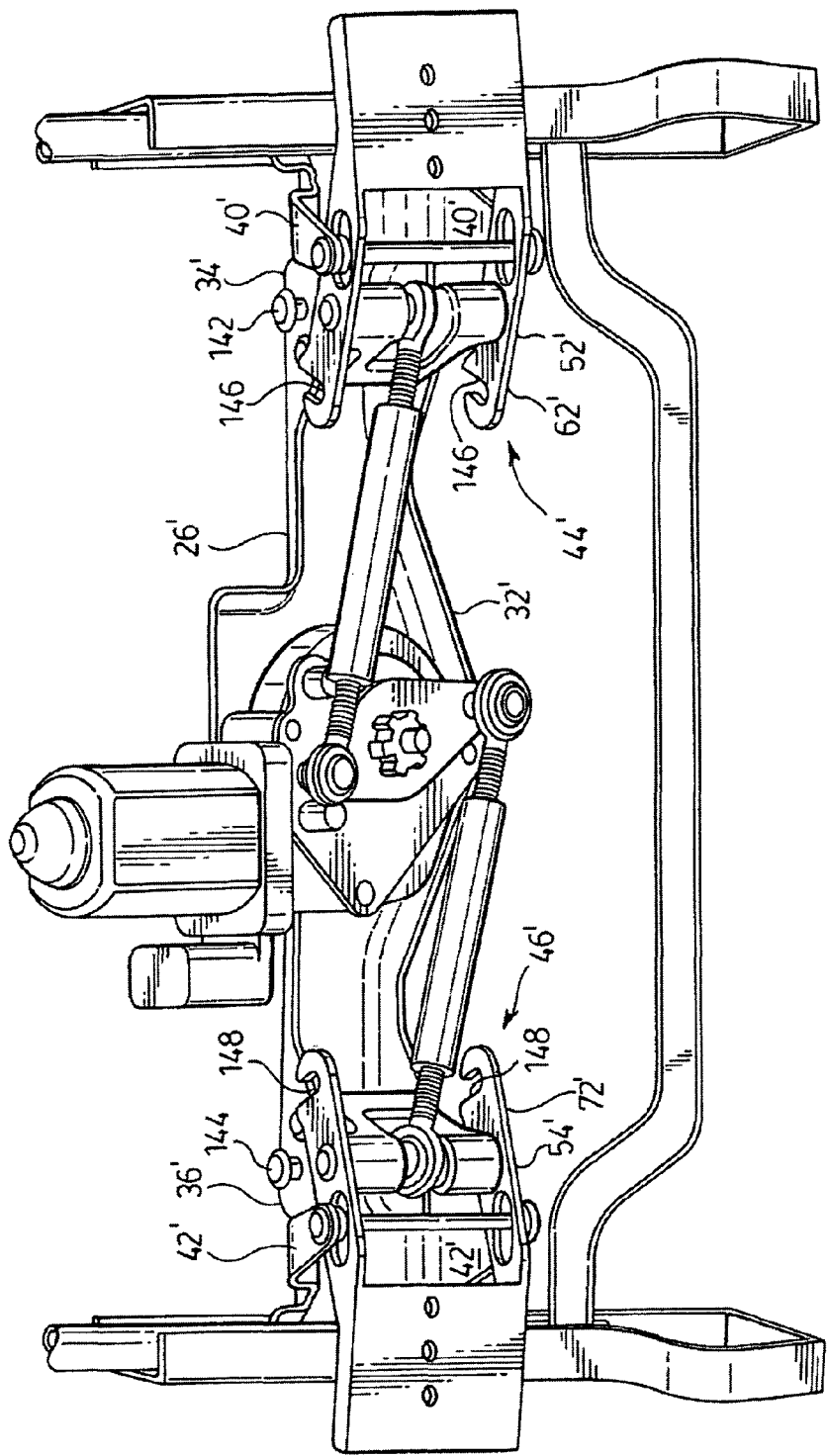
FIG. 8 is an enlarged, front perspective view of a second embodiment of the adjustable bolster assembly.
Figure 9:
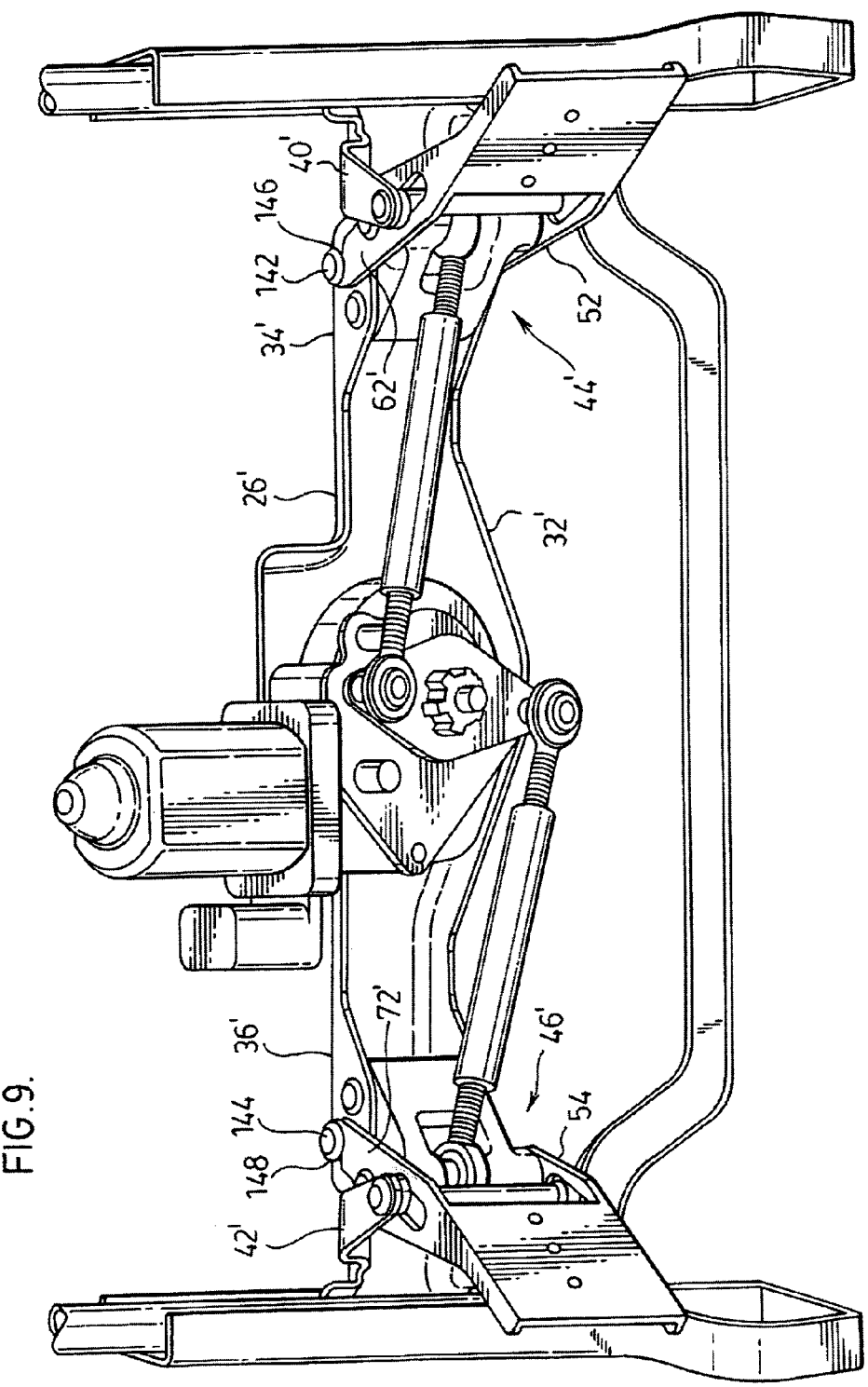
FIG. 9 is an enlarged, front perspective view of the second embodiment of the adjustable bolster assembly in an actuated position.

Referring to FIGS. 8 and 9, wherein like primed reference numerals represent similar elements as those described above, in a second embodiment of the invention each of the first 44' and second 46' adjustment mechanisms include a pair of positive stops (one shown) 142, 144 fixedly secured to the mounting bracket 32' and a pair of vertically spaced apart open slots 146, 148 integrally formed with each paddle mount 52', 54'. The open slots 146, 148 engage the positive stops 142, 144 to provide stability to the first 28' and second 30' side bolster paddles in the fore/aft and vertical directions when the first 28' and second 30' side bolster paddles are in the deployed position. More specifically, the positive stops 142, 144 are disposed at the first 34' and second 36' ends of the mounting bracket 32' adjacent the guide arms 40', 42'. The proximal end 62', 72' of each paddle mount 52', 54' extends to include the integrally formed open slots 146, 148. When the first 28' and second 30' side bolster paddles are in the deployed position, the open slots 146, 148 engage the respective positive stops 142, 144. When the first 28' and second 30' side bolster paddles are in the retracted position, the open slots 146, 148 are unengaged and away from the respective positive stops 142, 144.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. An adjustable bolster assembly for use with a seat assembly, said adjustable bolster assembly comprising:
    a mounting bracket configured to be fixedly secured to the seat assembly;
    a pair of side bolster paddles, each of said side bolster paddles slidably and pivotally mounted on said mounting bracket for movement between a retracted position and a deployed position, in which said pair of side bolster paddles extend forward and outward of said mounting bracket;
    an actuator assembly comprising a rotatable plate mounted on said mounting bracket and operatively coupled to said pair of side bolster paddles for effecting said movement, said rotatable plate have a pair of diametrically opposed first and second pivotal connection ends;
    a first rod operatively coupled between said first pivotal connection end and one of said side bolster paddles and a second rod operatively coupled between said second pivotal connection end and said other of said side bolster paddles for actuating movement of said side bolsters paddles between said retracted and deployed positions in response to rotation of said rotatable plate and; further including an adjustment mechanism pivotally coupling each of said pair of side bolster paddles to said mounting bracket, said adjustment mechanism including a lever arm, said lever arm being pivotally mounted on said mounting bracket and pivotally engaging a proximal end of at least one of said pair of side bolster paddles, said first and second rods extending between said actuator assembly and said respective one of said lever arms and operable to move said pair of side bolster paddles between said retracted and deployed positions.

2. An adjustable bolster assembly as set forth in claim 1 wherein said mounting bracket has a pair of guides, each of said guides slidably and pivotally receive one of said pair of side bolster paddles.

3. An adjustable bolster assembly as set forth in claim 2 wherein each of said guides has a guide pin engaging a respective slot on each of said pair of side bolster paddles.

4. An adjustable bolster assembly as set forth in claim 3, wherein said actuator assembly comprises a motor operatively engaging a gearbox, said rotatable plate mounted on an output shaft of said gearbox.

5. An adjustable bolster assembly as set forth in claim 3, wherein said actuator assembly includes a pair of bosses limiting travel of said rotatable plate when said pair of side bolster paddles are in either of said retracted position and said deployed position.

6. An adjustable bolster assembly as set forth in claim 3, wherein said mounting bracket has a pair of stops, each of said stops limiting travel of one of said side bolster paddles in said deployed position.

7. An adjustable bolster assembly as set forth in claim 3, wherein each of said rods are extendible in length.

8. An adjustable bolster assembly as set forth in claim 3, wherein said adjustable bolster assembly comprises a shield covering said actuator assembly.

* * * * *